(12) United States Patent
Ogata

(10) Patent No.: US 7,993,225 B2
(45) Date of Patent: Aug. 9, 2011

(54) HYDRAULIC PRESSURE SUPPLY UNIT OF CONTINUOUSLY VARIABLE TRANSMISSION

(75) Inventor: Yusuke Ogata, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 99 days.

(21) Appl. No.: 12/616,220

(22) Filed: Nov. 11, 2009

(65) Prior Publication Data

US 2010/0151977 A1    Jun. 17, 2010

(30) Foreign Application Priority Data

Dec. 17, 2008 (JP) ................................. 2008-321196

(51) Int. Cl.
*F16H 59/00* (2006.01)
(52) U.S. Cl. .......................................... 474/28
(58) Field of Classification Search ................ 474/8–28
See application file for complete search history.

(56) References Cited

U.S. PATENT DOCUMENTS

| 4,674,363 | A * | 6/1987 | Miyawaki | 477/49 |
| 7,918,753 | B2 * | 4/2011 | Murakami et al. | 474/28 |
| 2004/0063525 | A1 * | 4/2004 | Ochiai et al. | 474/28 |
| 2004/0176198 | A1 * | 9/2004 | Nobu | 474/28 |
| 2005/0107195 | A1 * | 5/2005 | Katou | 474/28 |
| 2007/0232423 | A1 * | 10/2007 | Katou et al. | 474/28 |

FOREIGN PATENT DOCUMENTS

| JP | 7-197958 | 8/1995 |
| JP | 9-105457 | 4/1997 |
| JP | 2004-169895 | 6/2004 |
| JP | 2007-255439 | 10/2007 |

OTHER PUBLICATIONS

Japanese Office Action issued Oct. 26, 2010, in Patent Application No. 2008-321196 (with English-language translation).

* cited by examiner

Primary Examiner — Michael R Mansen
Assistant Examiner — Robert T Reese
(74) Attorney, Agent, or Firm — Oblon, Spivak, McClelland, Maier & Neustadt, L.L.P.

(57) ABSTRACT

A control valve switches between the (A) state where the first oil passage to which a hydraulic pressure obtained by decreasing a line pressure is supplied is in communication with the fifth oil passage for supplying the hydraulic pressure to a forward clutch or a reverse brake and the third oil passage to which a hydraulic pressure controlled by an SLP linear solenoid valve is supplied is in communication with the sixth oil passage for supplying the hydraulic pressure to a primary pulley, and the (B) state where the second oil passage to which a hydraulic pressure controlled by an SLT linear solenoid valve is supplied is in communication with the fifth oil passage and the fourth oil passage for supplying the hydraulic pressure to a secondary pulley is in communication with the sixth oil passage. The fourth oil passage has an orifice.

3 Claims, 6 Drawing Sheets

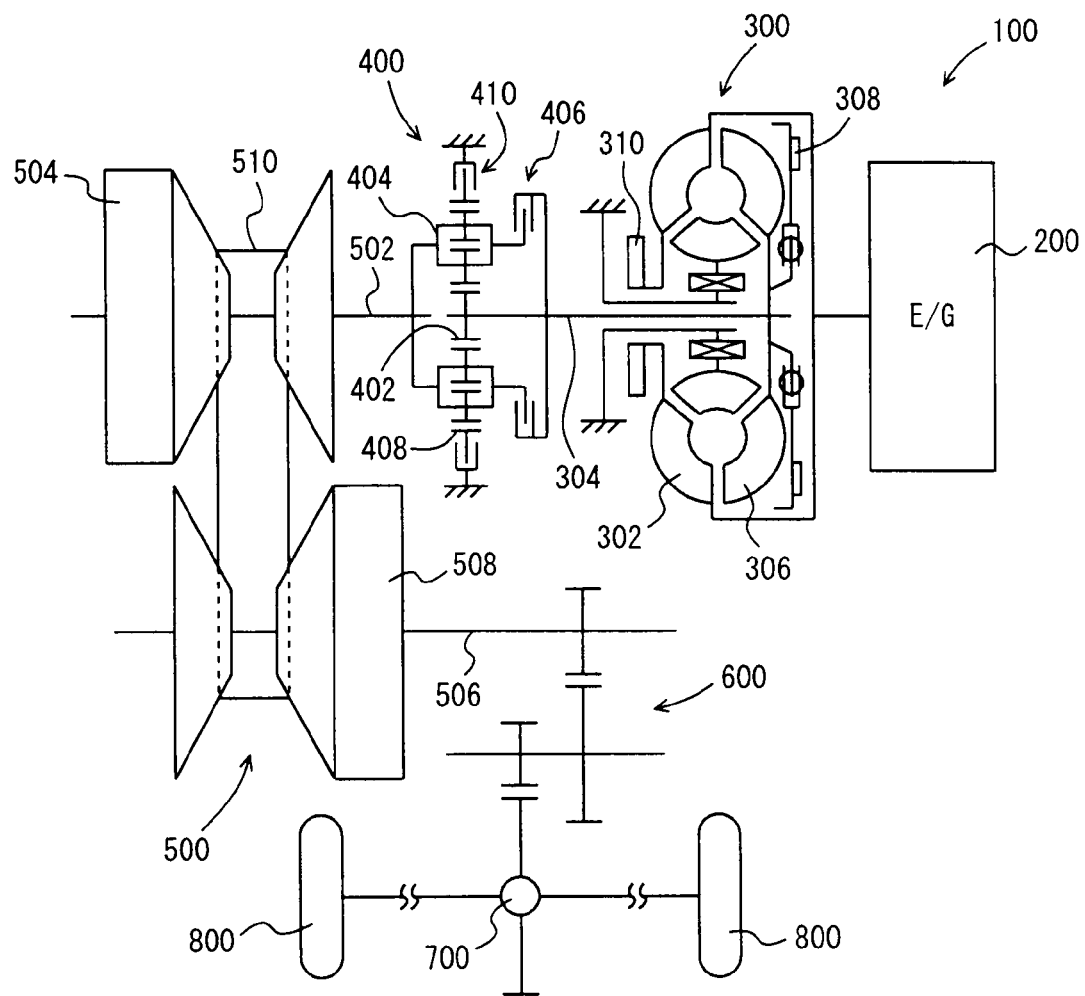
F I G . 1

HYDRAULIC PRESSURE SUPPLY UNIT OF CONTINUOUSLY VARIABLE TRANSMISSION

This nonprovisional application is based on Japanese Patent Application No. 2008-321196 filed on Dec. 17, 2008, with the Japan Patent Office, the entire contents of which are hereby incorporated by reference.

BACKGROUND OF THE INVENTION

1. Field of the Invention

The present invention relates to a hydraulic pressure supply unit of a continuously variable transmission (CVT), and particularly to a friction engagement element to be engaged during the vehicle running and a hydraulic circuit used for supplying hydraulic pressure to a primary pulley.

2. Description of the Background Art

A continuously variable transmission which can continuously change a gear ratio is conventionally known. In the continuously variable transmission, for example, a metal belt or a chain is held by each of a primary pulley and a secondary pulley. Also in the continuously variable transmission, the gear ratio is changed generally by changing the hydraulic pressure supplied to the primary pulley, and more specifically, the hydraulic pressure supplied to a primary sheave of the primary pulley.

For example, as the hydraulic pressure supplied to the primary sheave of the primary pulley is increased, the groove width of the primary pulley is narrowed. Consequently, the effective diameter of the primary pulley is increased. In accordance with an increase in the effective diameter of the primary pulley, the groove width of the secondary pulley is increased and the effective diameter thereof is decreased, which leads to upshifting.

In contrast, as the hydraulic pressure supplied to the primary sheave of the primary pulley is decreased, the groove width of the primary pulley is increased. Consequently, the effective diameter of the primary pulley is decreased. In accordance with a decrease in the effective diameter of the primary pulley, the groove width of the secondary pulley is narrowed and the effective diameter thereof is increased, which leads to downshifting.

Accordingly, when the hydraulic pressure supplied to the primary sheave of the primary pulley is decreased, for example, due to some irregular conditions, unnecessary downshift may occur. Therefore, there is a need to provide the continuously variable transmission with a fail-safe function for preventing irrelevant downshifting.

Japanese Patent Laying-Open No. 2004-169895 discloses a control device of a continuously variable transmission which includes a gear ratio control solenoid valve for generating control hydraulic pressure based on an electric signal and a gear ratio control valve operated by the control hydraulic pressure to supply and discharge ATF (Automatic Transmission Fluid) to and from a drive pulley, and changes the gear ratio by the relative change between the primary pressure acting on the drive pulley and the line pressure acting on the driven pulley. The gear ratio control valve is configured so as to allow the ATF to be supplied to the drive pulley in the state where the electric signal cannot be conducted to the gear ratio control solenoid valve. Between the gear ratio control valve and the drive pulley, a pressure-adjusting valve is provided for maintaining a prescribed primary pressure by supplying and discharging the ATF to and from the drive pulley by the feedback pressure from the drive pulley, in the state where the electric signal cannot be conducted to the gear ratio control solenoid valve.

According to the control device of the continuously variable transmission disclosed in Japanese Patent Laying-Open No. 2004-169895, in the case where the ATF leaks, the feedback pressure falls and the pressure-adjusting valve brings the drive pulley into communication with the gear ratio control valve, which allows the ATF to be supplied to the drive pulley. Accordingly, the primary pressure can be maintained at the prescribed pressure, with the result that the gear ratio can be maintained.

However, the valve having only a fail-safe function as disclosed in Japanese Patent Laying-Open No. 2004-169895 is additionally provided, which poses a problem that the number of components increases.

SUMMARY OF THE INVENTION

The present invention aims to implement a fail-safe function while suppressing an increase in the number of components.

A hydraulic pressure supply unit of a continuously variable transmission according to an embodiment includes a primary pulley and a secondary pulley each holding a transmission member transmitting power, and a friction engagement element to which hydraulic pressure is supplied for engagement to transmit, to a wheel, power output from a driving source, and changes a gear ratio in accordance with the hydraulic pressure supplied to the primary pulley. The hydraulic pressure supply unit includes a first oil passage to which a hydraulic pressure obtained by decreasing a line pressure is supplied; a second oil passage to which a hydraulic pressure controlled by a first solenoid valve is supplied; a third oil passage to which a hydraulic pressure controlled by a second solenoid valve is supplied; a fourth oil passage for supplying a hydraulic pressure to a different device from the primary pulley; a fifth oil passage for supplying a hydraulic pressure to the friction engagement element; a sixth oil passage for supplying a hydraulic pressure to the primary pulley; and a switching valve for switching between a first state where the fifth oil passage is in communication with the first oil passage and interrupted from the second oil passage, and the sixth oil passage is in communication with the third oil passage and interrupted from the fourth oil passage, and a second state where the fifth oil passage is in communication with the second oil passage and interrupted from the first oil passage, and the sixth oil passage is in communication with the fourth oil passage and interrupted from the third oil passage. The fourth oil passage has an orifice provided therein.

According to the above-described configuration, the switching valve switches between the first state where the hydraulic pressure controlled by the second solenoid valve is supplied to the primary pulley and the second state where the hydraulic pressure supplied to a different device from the primary pulley is supplied also to the primary pulley. In the first state, the gear ratio of the continuously variable transmission can be controlled to be optimal. In the second state, the hydraulic pressure supplied to the different device from the primary pulley is supplied also to the primary pulley. Accordingly, when the hydraulic pressure supplied to the primary pulley is decreased due to some irregular conditions in the first state, the switching valve is switched from the first state to the second state, so that the hydraulic pressure supplied to the primary pulley can be maintained. Furthermore, in the first state, the hydraulic pressure obtained by decreasing a line pressure is supplied to the friction engagement element (a clutch or a brake). In the second state, the hydraulic pressure controlled by the first solenoid valve is supplied to the friction engagement element. Consequently, when the friction engagement element is engaged, the hydraulic pressure controlled by the first solenoid valve is supplied to the friction engagement element, which allows the friction engagement element to be engaged such that the impact at the time of engagement is reduced. When the friction engagement element is engaged, the hydraulic pressure supplied to the primary pulley is maintained by the orifice. Accordingly, unnecessary downshift of the continuously variable transmission can be prevented from occurring. After the friction engagement element is engaged, the hydraulic pressure obtained by decreasing a line pressure is supplied to the friction engagement element, which allows the friction engagement element to be held in the engaged state such that the power output from the driving source is transmitted to wheels. Thus, the fail-safe function for the hydraulic pressure supplied to the primary pulley can be implemented using the switching valve for switching the hydraulic pressure supplied to the friction engagement element. Accordingly, the fail-safe function can be achieved without the need to provide a dedicated valve having only the fail-safe function. Consequently, the hydraulic pressure supply unit of the continuously variable transmission capable of implementing a fail-safe function while suppressing an increase in the number of components can be provided.

Preferably, the device is the secondary pulley.

According to the above-described configuration, in the case where the hydraulic pressure supplied to the primary pulley is decreased due to some irregular conditions, the hydraulic pressure supplied to the secondary pulley is supplied also to the primary pulley, so that the fail-safe function can be implemented.

Further preferably, the hydraulic pressure supply unit of the continuously variable transmission further includes a switching mechanism for switching the switching valve from the first state to the second state in a case where the friction engagement element is changed from a disengaged state to an engaged state and in a case where the continuously variable transmission downshifts in a state where the continuously variable transmission is controlled such that the continuously variable transmission is prevented from downshifting.

According to the above-described configuration, when the friction engagement element is changed from the disengaged state to the engaged state, the hydraulic pressure controlled by the first solenoid valve is supplied to the friction engagement element. This allows the friction engagement element to be engaged such that the impact at the time of engagement is reduced. Furthermore, when the continuously variable transmission downshifts in the state where the continuously variable transmission is controlled so as not to downshift, the hydraulic pressure supplied to a different device from the primary pulley is supplied also to the primary pulley. Consequently, in the case where the hydraulic pressure supplied to the primary pulley is decreased due to some irregular conditions, the hydraulic pressure supplied to the primary pulley can be maintained. Therefore, unintentional downshift can be prevented from proceeding.

Further preferably, in the case where the continuously variable transmission downshifts in the state where the continuously variable transmission is controlled such that the continuously variable transmission is prevented from downshifting, the first solenoid valve is controlled such that the friction engagement element can be held in the engaged state by the hydraulic pressure controlled by the first solenoid valve when the switching valve is switched to the second state.

According to the above-described configuration, in the case where the switching valve is switched to the second state due to downshifting which is not intended by the driver, the friction engagement element can be held in the engaged state by the hydraulic pressure controlled by the first solenoid valve.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram of a power train of a vehicle.

DESCRIPTION OF THE PREFERRED EMBODIMENTS

Figure 2:
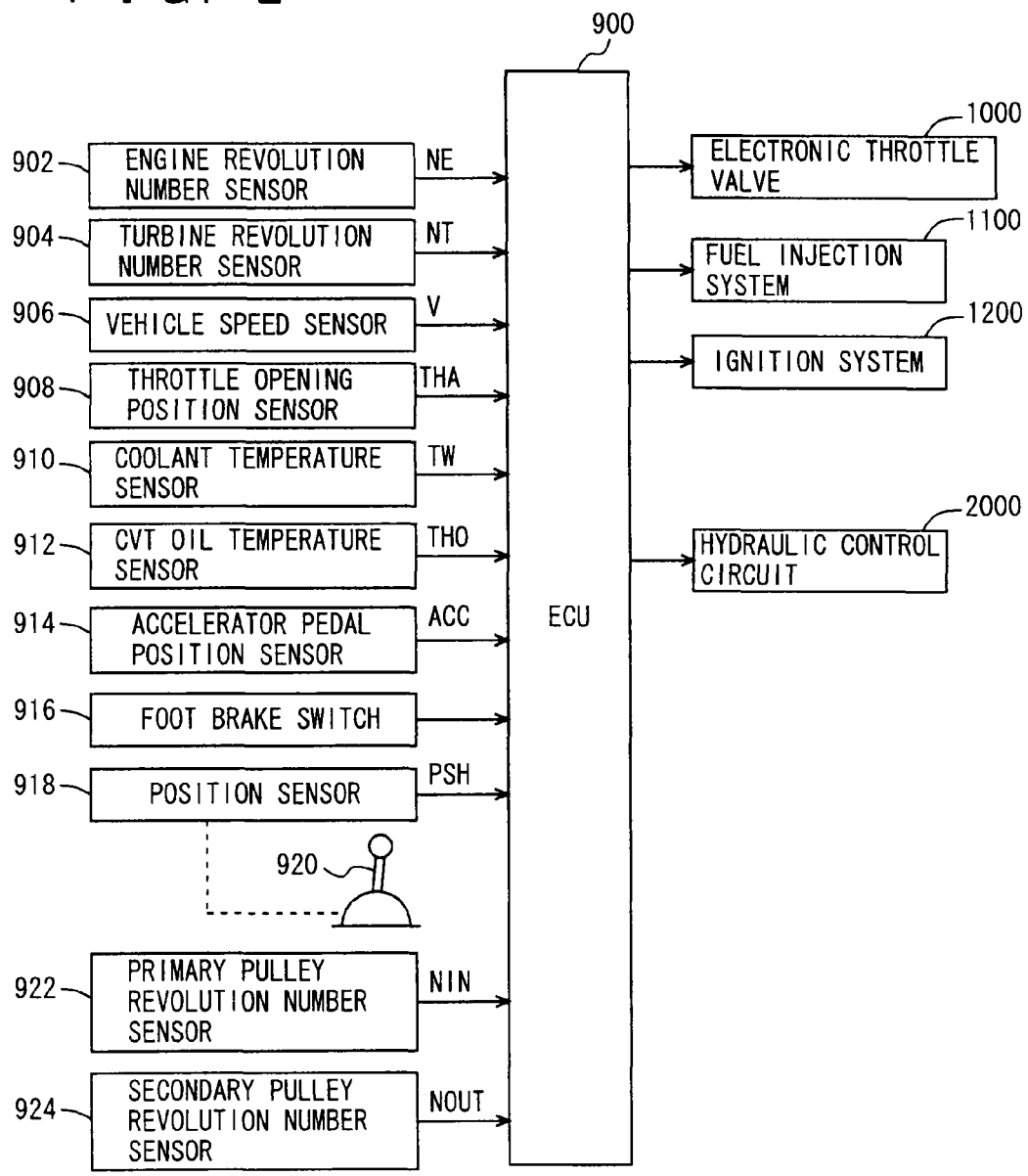
FIG. 2 is a control block diagram of an ECU.

The embodiments of the present invention will be hereinafter described with reference to the accompanying drawings, in which the same components are designated by the same reference characters and have the same names and functions. Accordingly, detailed description thereof will not be repeated.

Referring to FIG. 1, the output power of an engine 200 of a power train 100 mounted in the vehicle is input to a continuously variable transmission 500 having a forward and backward movement switching device 400 through a torque converter 300. The output power of continuously variable transmission 500 is transmitted to a reduction gear 600 and a differential gear 700, and distributed to a driving wheel 800 on each of the right and left sides. Power train 100 is controlled by an ECU (Electronic Control Unit) 900 described below. In place of or in addition to engine 200, a motor may be used as a driving source.

Torque converter 300 includes a pump impeller 302 coupled to the crankshaft of engine 200 and a turbine runner 306 coupled to forward and backward movement switching device 400 via a turbine shaft 304. A lock-up clutch 308 is provided between pump impeller 302 and turbine runner 306. Lock-up clutch 308 is engaged or disengaged when the supply of the hydraulic pressure to the oil chamber is switched between the engagement side and the disengagement side.

When lock-up clutch 308 is completely engaged, pump impeller 302 and turbine runner 306 are integrally rotated. Pump impeller 302 is provided with a mechanical oil pump 310 which generates hydraulic pressure for performing the shift control of continuously variable transmission 500, generating the belt holding pressure by which the belt is pressed laterally from both sides and supplying the ATF for lubrication to each unit.

Forward and backward movement switching device 400 includes a double-pinion type planetary gear train. Turbine shaft 304 of torque converter 300 is coupled to a sun gear 402. An input shaft 502 of continuously variable transmission 500 is coupled to a carrier 404. Carrier 404 and sun gear 402 are coupled to each other through a forward clutch 406. A ring gear 408 is fixed to a housing via a reverse brake 410. Forward clutch 406 and reverse brake 410 are frictionally engaged by a hydraulic cylinder. The input revolution number of forward clutch 406 is equal to the revolution number of turbine shaft 304, that is, a turbine revolution number NT.

Forward clutch 406 is engaged and reverse brake 410 is disengaged, to thereby cause forward and backward movement switching device 400 to be in the engaged state for forward running. In this state, the driving force in the forward running direction is transmitted to continuously variable transmission 500. Reverse brake 410 is engaged and forward clutch 406 is disengaged, to thereby cause forward and backward movement switching device 400 to be in the engaged state for backward running. In this state, input shaft 502 is rotated in the opposite direction with respect to turbine shaft 304. This causes the driving force in the backward running direction to be transmitted to continuously variable transmission 500.

In other words, as forward clutch 406 or reverse brake 410 is engaged, the power output from engine 100 is transmitted to driving wheel 800. When forward clutch 406 and reverse brake 410 are both disengaged, forward and backward movement switching device 400 goes into the neutral state in which power transmission is interrupted.

It is to be noted that forward and backward movement switching device 400 may be disposed between continuously variable transmission 500 and driving wheel 800.

Continuously variable transmission 500 includes a primary pulley 504 provided to input shaft 502, a secondary pulley 508 provided to an output shaft 506, and a metal belt 510 wound around these pulleys. The friction force between each pulley and metal belt 510 is used for power transmission.

Each pulley is formed of the hydraulic cylinder (sheave) such that its groove has a variable width. The hydraulic pressure of the hydraulic cylinder of primary pulley 504, that is, a primary sheave, is controlled, so that the groove width of each pulley varies. This causes a change in the effective diameter of each pulley and thus allows a continuous change in a gear ratio GR (=a primary pulley revolution number NIN/a secondary pulley revolution number NOUT). It is to be noted that a chain may be used in place of metal belt 510.

As shown in FIG. 2, connected to ECU 900 is an engine revolution number sensor 902, a turbine revolution number sensor 904, a vehicle speed sensor 906, a throttle opening position sensor 908, a coolant temperature sensor 910, an oil temperature sensor 912, an accelerator pedal position sensor 914, a foot brake switch 916, a position sensor 918, a primary pulley revolution number sensor 922, and a secondary pulley revolution number sensor 924.

Engine revolution number sensor 902 detects a revolution number (engine revolution number) NE of engine 200. Turbine revolution number sensor 904 detects a revolution number (turbine revolution number) NT of turbine shaft 304. Vehicle speed sensor 906 detects a vehicle speed V. Throttle opening position sensor 908 detects an opening position THA of the electronic throttle valve. Coolant temperature sensor 910 detects a coolant temperature TW of engine 200. Oil temperature sensor 912 detects a temperature of the ATF (hereinafter also referred to as an oil temperature) THO that is used for actuating continuously variable transmission 500. Accelerator pedal position sensor 914 detects an accelerator pedal position ACC. Foot brake switch 916 detects whether the foot brake is operated or not. Position sensor 918 detects a position PSH of a shift lever 920 by determining whether the contact point provided in the position corresponding to the shift position is ON or OFF. Primary pulley revolution number sensor 922 detects a revolution number (input shaft revolution number) NIN of primary pulley 504. Secondary pulley revolution number sensor 924 detects a revolution number (output shaft revolution number) NOUT of secondary pulley 508. The signal representative of the detection result of each sensor is transmitted to ECU 900. During forward running in which forward clutch 406 is engaged, turbine revolution number NT is equal to primary pulley revolution number NIN. Vehicle speed V attains a value corresponding to secondary pulley revolution number NOUT. Consequently, in the state where the vehicle is at a standstill and forward clutch 406 is engaged, turbine revolution number NT becomes 0.

ECU 900 includes a CPU (Central Processing Unit), a memory, an input/output interface, and the like. The CPU performs signal processing in accordance with the program stored in the memory, to perform output power control of engine 200, shift control of continuously variable transmission 500, control of the belt holding pressure, engagement/disengagement control of forward clutch 406, engagement/disengagement control of reverse brake 410, and the like.

The output power of engine 200 is controlled by an electronic throttle valve 1000, a fuel injection system 1100, an ignition system 1200, and the like. A hydraulic control circuit 2000 performs shift control of continuously variable transmission 500, control of the belt holding pressure, engagement/disengagement control of forward clutch 406, and engagement/disengagement control of reverse brake 410.

Figure 3:
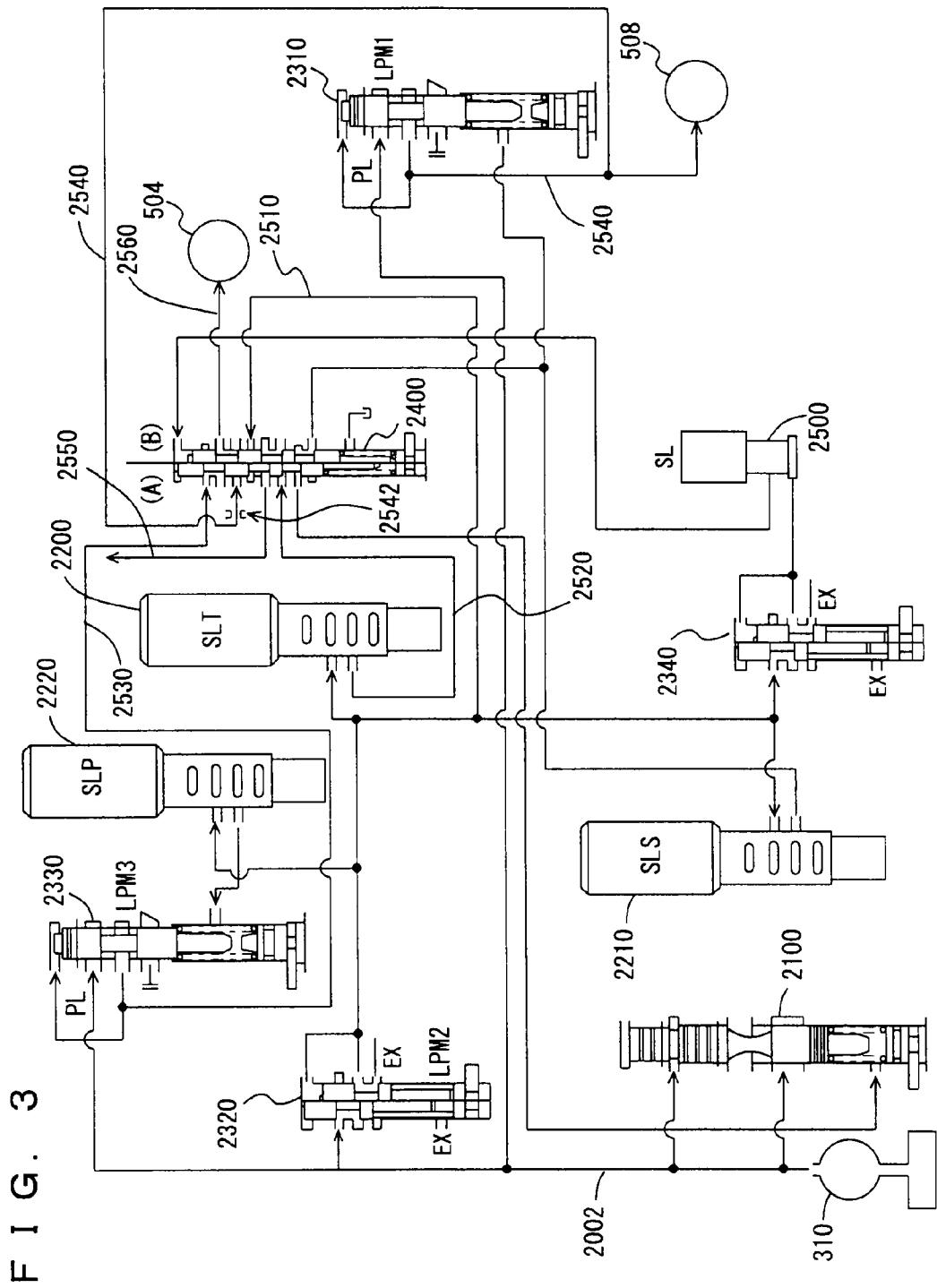
FIG. 3 is a diagram (first) of a hydraulic control circuit.
Figure 4:
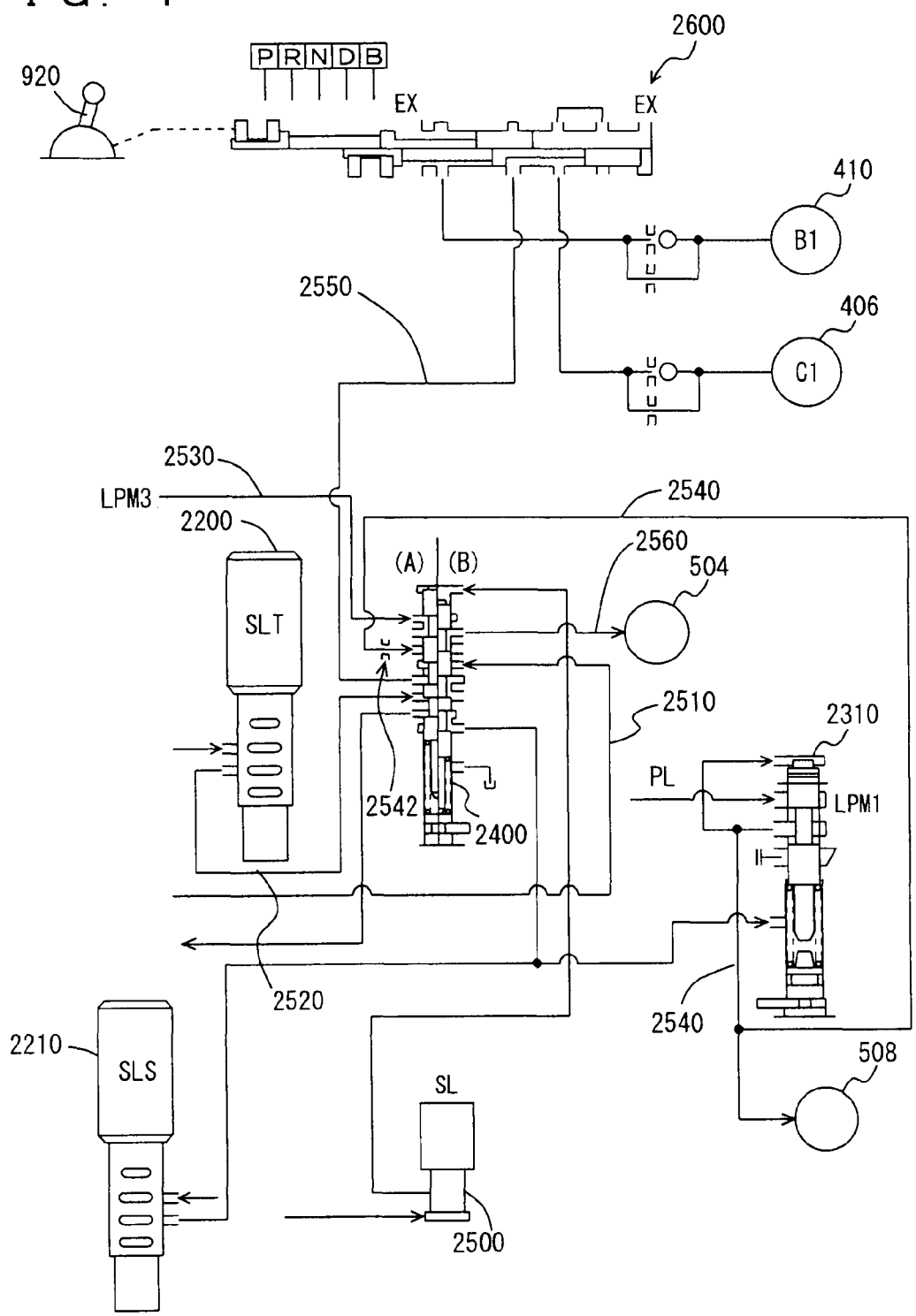
FIG. 4 is a diagram (second) of the hydraulic control circuit.

Referring to FIGS. 3 and 4, the main part of hydraulic control circuit 2000 used as a hydraulic pressure supply unit according to the present embodiment will then be described. It is to be noted that hydraulic control circuit 2000 described below is merely an example and is not limited as such.

The hydraulic pressure generated by oil pump 310 is supplied through a line pressure oil passage 2002 to a primary regulator valve 2100, a line pressure modulator (LPM) 1 valve 2310, an LPM 2 valve 2320, and an LPM 3 valve 2330.

A control pressure is selectively supplied from one of an SLT linear solenoid valve 2200 and an SLS linear solenoid valve 2210 to primary regulator valve 2100. The control pressure supplied to primary regulator valve 2100 is selected by a control valve 2400 from the control pressure (output hydraulic pressure) of SLT linear solenoid valve 2200 and the control pressure (output hydraulic pressure) of SLS linear solenoid valve 2210. Control valve 2400 will be described later.

The spool of primary regulator valve 2100 slides depending on the supplied control pressure, with the result that the hydraulic pressure generated in oil pump 310 is adjusted by primary regulator valve 2100. The hydraulic pressure adjusted by primary regulator valve 2100 is used as a line pressure PL. In the present embodiment, line pressure PL is increased in proportion to an increase in the control pressure supplied to primary regulator valve 2100. It is to be noted that line pressure PL may be lowered in proportion to an increase in the control pressure supplied to primary regulator valve 2100.

The hydraulic pressure output from LPM 2 valve 2320 is supplied to SLT linear solenoid valve 2200 and SLS linear solenoid valve 2210. The hydraulic pressure output from LPM 2 valve 2320 is supplied to an SLP linear solenoid valve 2220 in addition to SLT linear solenoid valve 2200 and SLS linear solenoid valve 2210.

Each of SLT linear solenoid valve 2200, SLS linear solenoid valve 2210 and SLP linear solenoid valve 2220 is a solenoid valve for generating control pressure in accordance with the current value determined by the duty signal (duty value) transmitted from ECU 900.

LPM 1 valve 2310 outputs the hydraulic pressure that is adjusted using line pressure PL as an original pressure. The hydraulic pressure output from LPM 1 valve 2310 is supplied to the hydraulic cylinder of secondary pulley 508, that is, a secondary sheave. The hydraulic pressure for preventing sliding of metal belt 510 is supplied to the hydraulic cylinder of secondary pulley 508. In other words, the belt holding pressure is increased or decreased depending on the output hydraulic pressure from LPM 1 valve 2310.

LPM 1 valve 2310 is provided with a spool capable of moving in the axial direction and a spring biasing the spool in one direction. LPM 1 valve 2310 outputs the hydraulic pressure using, as a pilot pressure, the output hydraulic pressure of SLS linear solenoid valve 2210 which is duty-controlled by ECU 900. LPM 1 valve 2310 outputs the hydraulic pressure reduced using line pressure PL introduced into LPM 1 valve 2310 as an original pressure.

LPM 2 valve 2320 outputs the hydraulic pressure reduced using line pressure PL as an original pressure. As described above, the hydraulic pressure output from LPM 2 valve 2320 is supplied to SLT linear solenoid valve 2200, SLS linear solenoid valve 2210 and SLP linear solenoid valve 2220.

LPM 3 valve 2330 outputs the hydraulic pressure adjusted using line pressure PL as an original pressure. LPM 3 valve 2330 is provided with a spool capable of moving in the axial direction and a spring biasing the spool in one direction. LPM 3 valve 2330 reduces line pressure PL introduced into LPM 3 valve 2330 using, as a pilot pressure, the output hydraulic pressure of SLP linear solenoid valve 2220 which is duty-controlled by ECU 900. In other words, the hydraulic pressure controlled by SLP linear solenoid valve 2220 is output from LPM 3 valve 2330.

The hydraulic pressure output from LPM 3 valve 2330 is supplied to the hydraulic cylinder of primary pulley 504 (primary sheave) through control valve 2400. By controlling supply and discharge of the hydraulic pressure to and from the hydraulic cylinder of primary pulley 504, gear ratio GR of continuously variable transmission 500 is controlled.

As the hydraulic pressure supplied to the hydraulic cylinder of primary pulley 504 is increased, the groove width of primary pulley 504 is narrowed. This causes a decrease in gear ratio GR, that is, an upshift of continuously variable transmission 500.

As the hydraulic pressure supplied to the hydraulic cylinder of primary pulley 504 is decreased, the groove width of primary pulley 504 is increased. This causes an increase in gear ratio GR, that is, a downshift of continuously variable transmission 500.

Gear ratio GR is controlled such that primary pulley revolution number NIN reaches a target revolution number that is set using the map. The target revolution number is set using the map including vehicle speed V and accelerator pedal position ACC each as a parameter. It is to be noted that the method for controlling gear ratio GR is not limited thereto.

A modulator valve 2340 outputs the hydraulic pressure reduced using the hydraulic pressure output from LPM 2 valve 2320 as an original pressure. The hydraulic pressure output from modulator valve 2340 is supplied to an SL solenoid valve 2500.

Control valve 2400 has an input port to which a first oil passage 2510 is connected, an input port to which a second oil passage 2520 is connected, an input port to which a third oil passage 2530 is connected, and an input port to which a fourth oil passage 2540 is connected. The hydraulic pressure obtained by decreasing a line pressure using LPM 2 valve 2320 is supplied to first oil passage 2510. The hydraulic pressure controlled by SLT linear solenoid valve 2200 is supplied to second oil passage 2520. The hydraulic pressure controlled by SLP linear solenoid valve 2220 is supplied to third oil passage 2530. The hydraulic pressure to secondary pulley 508 is supplied to fourth oil passage 2540. Fourth oil passage 2540 has an orifice 2542 provided therein.

It is to be noted that the oil passage that does not supply hydraulic pressure to primary pulley 504 but supplies hydraulic pressure to devices other than secondary pulley 508 may be used as fourth oil passage 2540.

Furthermore, control valve 2400 also has an output port to which a fifth oil passage 2550 is connected and an output port to which a sixth oil passage 2560 is connected. Fifth oil passage 2550 supplies hydraulic pressure through a manual valve 2600 described below to forward clutch 406 or reverse brake 410. Sixth oil passage 2560 supplies hydraulic pressure to primary pulley 504.

The spool of control valve 2400 is switched to one of the (A) state (on the left side) and the (B) state (on the right side) in FIG. 3.

In other words, control valve 2400 switches between the (A) state where fifth oil passage 2550 is in communication with first oil passage 2510 and interrupted from second oil passage 2520, and sixth oil passage 2560 is in communication with third oil passage 2530 and interrupted from fourth oil passage 2540; and the (B) state where fifth oil passage 2550 is in communication with second oil passage 2520 and interrupted from first oil passage 2510, and sixth oil passage 2560 is in communication with fourth oil passage 2540 and interrupted from third oil passage 2530.

When the spool of control valve 2400 is in the (A) state (on the left side) in FIG. 3, the control pressure is supplied from SLT linear solenoid valve 2200 to primary regulator valve 2100. In other words, line pressure PL is controlled in accordance with the control pressure of SLT linear solenoid valve 2200.

When the spool of control valve 2400 is in the (B) state (on the right side) in FIG. 3, the control pressure is supplied from SLS linear solenoid valve 2210 to primary regulator valve 2100. In other words, line pressure PL is controlled in accordance with the control pressure of SLS linear solenoid valve 2210.

The spool of control valve 2400 is biased in one direction by a spring. The hydraulic pressure is supplied from SL solenoid valve 2500 so as to oppose the biasing force of this spring.

In the case where the hydraulic pressure is supplied from SL solenoid valve 2500 to control valve 2400, the spool of control valve 2400 goes into the (B) state in FIG. 3.

In the case where the hydraulic pressure is not supplied from SL solenoid valve 2500 to control valve 2400, the spool of control valve 2400 goes into the (A) state in FIG. 3 by the biasing force of the spring.

For example, when a garage shift is performed in which shift lever 920 is operated from the "N" position to the "D" position or the "R" position, that is, when forward clutch 406 or reverse brake 410 is shifted from the disengaged state to the engaged state, SL solenoid valve 2500 is controlled to switch the spool of control valve 2400 from the (A) state to the (B) state in FIG. 3. In other words, SL solenoid valve 2500 is controlled by ECU 900 so as to output the hydraulic pressure.

Furthermore, when continuously variable transmission 500 downshifts in the state where continuously variable transmission 500 is controlled not to downshift, SL solenoid valve 2500 is controlled to switch the spool of control valve 2400 from the (A) state to the (B) state in FIG. 3. In other words, when irrelevant downshift occurs, the spool of control valve 2400 is switched from the (A) state to the (B) state.

Since ECU 900 determines how to control continuously variable transmission 500, it is determined within ECU 900 whether or not continuously variable transmission 500 is controlled not to downshift. Based on whether the ratio between primary pulley revolution number NIN and secondary pulley revolution number NOUT is changed, it is determined whether continuously variable transmission 500 downshifts or not. It is to be noted that the method for determining whether or not continuously variable transmission 500 downshifts in the state where continuously variable transmission 500 is controlled so as not to downshift is not limited as such.

In addition to the case where the garage shift occurs and the case where irrelevant downshift occurs, in the case where the neutral control execution condition is satisfied including the condition that the vehicle is stopped in the state where shift lever 920 is in the "D" position (the vehicle speed becomes "0"), the case where shift lever 920 is operated to the "R" position during forward running of the vehicle, and the like, the spool of control valve 2400 is switched from the (A) state to the (B) state in FIG. 3.

Referring to FIG. 4, manual valve 2600 will then be described. Manual valve 2600 is mechanically switched in accordance with the operation of shift lever 920. This causes forward clutch 406 and reverse brake 410 to be engaged or disengaged.

Shift lever 920 is operated to a "P" position for parking, an "R" position for backward running, an "N" position in which the power transmission is interrupted, and a "D" position and a "B" position for forward running.

In the "P" position and the "N" position, the hydraulic pressure within forward clutch 406 and reverse brake 410 is drained from manual valve 2600, causing forward clutch 406 and reverse brake 410 to be disengaged.

In the "R" position, the hydraulic pressure is supplied from manual valve 2600 to reverse brake 410, causing reverse brake 410 to be engaged. Meanwhile, the hydraulic pressure within forward clutch 406 is drained from manual valve 2600, causing forward clutch 406 to be disengaged.

In the "D" position and the "B" position, the hydraulic pressure is supplied from manual valve 2600 to forward clutch 406, causing forward clutch 406 to be engaged. Meanwhile, the hydraulic pressure within reverse brake 410 is drained from manual valve 2600, causing reverse brake 410 to be disengaged.

The function of hydraulic control circuit 2000 obtained by the above-described configuration will be described below.

Figure 5:
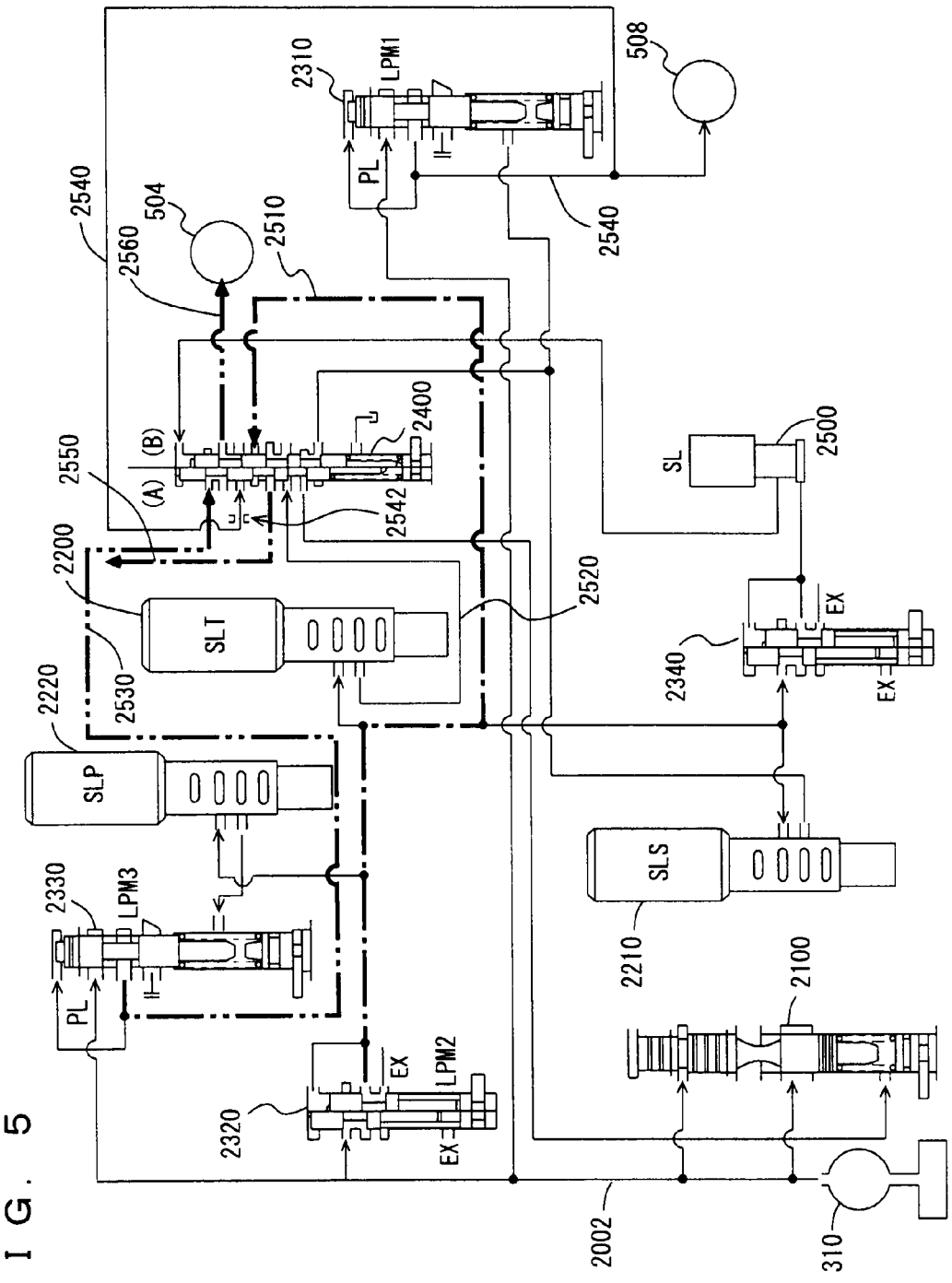
FIG. 5 is a diagram (third) of the hydraulic control circuit.

Referring to FIG. 5, for example, when the vehicle runs in the normal mode, ECU 900 controls SL solenoid valve 2500 not to output the hydraulic pressure. In this case, the spool of control valve 2400 goes into the (A) state by the biasing force of the spring.

While the spool of control valve 2400 is in the (A) state, fifth oil passage 2550 is in communication with first oil passage 2510 and interrupted from second oil passage 2520, and sixth oil passage 2560 is in communication with third oil passage 2530 and interrupted from fourth oil passage 2540.

Therefore, as shown by an alternate long and short dashed line in FIG. 5, the hydraulic pressure output from LPM 2 valve 2320 is supplied to manual valve 2600 through control valve 2400. Accordingly, if shift lever 920 is located in the "D" or "B" position, the hydraulic pressure is supplied from manual valve 2600 to forward clutch 406. This causes forward clutch 406 to be engaged. Consequently, forward clutch 406 is held in the engaged state by the hydraulic pressure supplied from LPM 2 valve 2320.

In the case where shift lever 920 is located in the "R" position, the hydraulic pressure is supplied from manual valve 2600 to reverse brake 410. This causes reverse brake 410 to be engaged. Consequently, reverse brake 410 is held in the engaged state by the hydraulic pressure supplied from LPM 2 valve 2320.

Furthermore, as shown by an alternate long and two short dashed line in FIG. 5, the hydraulic pressure output from LPM 3 valve 2330 is supplied through control valve 2400 to the hydraulic cylinder of primary pulley 504. In other words, the hydraulic pressure controlled by SLP linear solenoid valve 2220 is supplied to the hydraulic cylinder of primary pulley 504. Consequently, gear ratio GR of continuously variable transmission 500 can be controlled to be optimal.

Furthermore, when the spool of control valve 2400 is in the (A) state in FIG. 5, the control pressure is supplied from SLT linear solenoid valve 2200 to primary regulator valve 2100. Thus, SLT linear solenoid valve 2200 controls line pressure PL through control valve 2400. SLS linear solenoid valve 2210 controls the belt holding pressure via LPM 1 valve 2310.

Figure 6:
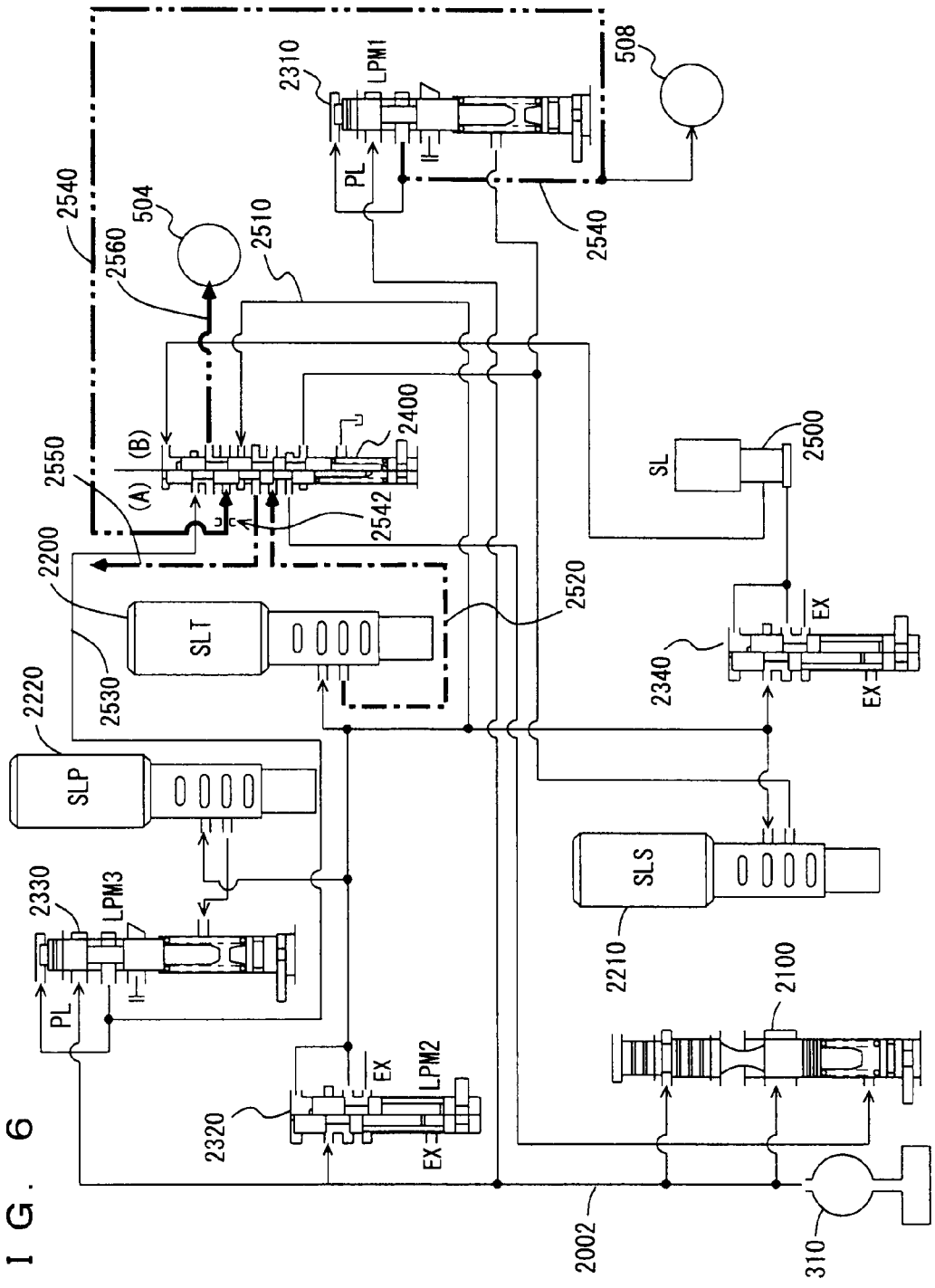
FIG. 6 is a diagram (fourth) of the hydraulic control circuit.

Referring to FIG. 6, for example, when continuously variable transmission 500 downshifts in the state where continuously variable transmission 500 is controlled not to downshift, that is, when a downshift not intended by the driver occurs, it can be said that the hydraulic pressure supplied to primary pulley 508 is reduced due to some irregular conditions. In this case, SL solenoid valve 2500 is controlled to output the hydraulic pressure. Accordingly, the spool of control valve 2400 is switched from the (A) state to the (B) state in FIG. 6.

When the spool of control valve 2400 is in the (B) state, fifth oil passage 2550 is in communication with second oil passage 2520 and interrupted from first oil passage 2510, and sixth oil passage 2560 is in communication with fourth oil passage 2540 and interrupted from third oil passage 2530.

Accordingly, as shown by an alternate long and two short dashed line in FIG. 6, the hydraulic pressure supplied to the hydraulic cylinder of secondary pulley 508 is supplied also to the hydraulic cylinder of primary pulley 504 through control valve 2400.

Consequently, the hydraulic pressure supplied to the hydraulic cylinder of primary pulley 504 can be maintained. Therefore, the fail-safe function for the hydraulic pressure supplied to the hydraulic cylinder of primary pulley 504 can be implemented.

Furthermore, as shown by an alternate long and short dashed line in FIG. 6, the hydraulic pressure controlled by SLT linear solenoid valve 2200 is supplied to manual valve 2600 through control valve 2400. Accordingly, if shift lever 920 is located in the "D" position or the "B" position, the hydraulic pressure is supplied from manual valve 2600 to forward clutch 406. Consequently, forward clutch 406 is held in the engaged state by the hydraulic pressure controlled by SLT linear solenoid valve 2200. In the case where the hydraulic pressure of SLT linear solenoid valve 2200 requires to be raised in order to maintain the engaged state, the output power of SL solenoid valve 2500 and the hydraulic pressure of SLT linear solenoid valve 2200 are both increased.

In the case where shift lever 920 is located in the "R" position, the hydraulic pressure is supplied from manual valve 2600 to reverse brake 410. Consequently, reverse brake 410 is held in the engaged state by the hydraulic pressure controlled by SLT linear solenoid valve 2200.

Also when the garage shift is performed such that shift lever 920 is operated from the "N" position to the "D" or "R" position, that is, when forward clutch 406 or reverse brake 410 is brought from the disengaged state to the engaged state, the spool of control valve 2400 is switched from the (A) state to the (B) state in FIG. 6.

In this case, if shift lever 920 is located in the "D" position or the "B" position, the hydraulic pressure is adjusted by SLT linear solenoid valve 2200 to thereby cause forward clutch 406 to be gently engaged, so that the impact at the time of engagement can be suppressed.

In the case where shift lever 920 is located in the "R" position, the hydraulic pressure is adjusted by SLT linear solenoid valve 2200 to thereby cause reverse brake 410 to be gently engaged, so that the impact at the time of engagement can be suppressed.

Also when the neutral control execution condition is satisfied, the spool of control valve 2400 is switched from the (A) state to the (B) state in FIG. 6. In this case, the neutral control can be executed by controlling the engagement force of forward clutch 406 so as to be reduced.

When the neutral control execution condition is satisfied, determination may be made based on turbine revolution number NT detected by turbine revolution number sensor 904 that forward clutch 406 cannot be disengaged or that the neutral control cannot be executed. More specifically, it may be determined that forward clutch 406 cannot be disengaged or the neutral control cannot be executed unless turbine revolution number NT detected by turbine revolution number sensor 904 is increased. Furthermore, in the case where it is determined that forward clutch 406 cannot be disengaged or the neutral control cannot be executed, it may be determined that a failure such as sticking of control valve 2400 occurs.

Also in the case where shift lever 920 is operated to the "R" position during forward running of the vehicle, the spool of control valve 2400 is switched from the (A) state to the (B) state in FIG. 6. In this case, ECU 900 controls SLT linear solenoid valve 2200 to disengage reverse brake 410, so that a reverse gear can be prevented from being implemented during forward running of the vehicle.

Furthermore, when the spool of control valve 2400 is in the (B) state in FIG. 6, the control pressure is supplied from SLS linear solenoid valve 2210 to primary regulator valve 2100. In other words, line pressure PL is controlled in accordance with the control pressure of SLS linear solenoid valve 2210. Therefore, SLS linear solenoid valve 2210 controls the belt holding pressure through LPM 1 valve 2310 and also, in place of SLT linear solenoid valve 2200, controls line pressure PL.

In the case where the garage shift is performed, the case where the neutral control execution condition is satisfied, the case where shift lever 920 is operated to the "R" position during forward running of the vehicle, and the like, the hydraulic pressure supplied to secondary pulley 508 is supplied also to the hydraulic cylinder of primary pulley 504 even if the hydraulic pressure supplied to the hydraulic cylinder of primary pulley 504 is sufficiently high.

In such a case, the hydraulic pressure in the hydraulic cylinder of primary pulley 504 is maintained by orifice 2542 provided in fourth oil passage 2540. Consequently, unnecessary upshift or downshift of continuously variable transmission 500 can be prevented.

As described above, according to the hydraulic pressure supply unit in accordance with the present embodiment, the control valve is used to switch between the (A) state where the hydraulic pressure controlled by the SLP linear solenoid valve is supplied to the hydraulic cylinder of the primary pulley, and the (B) state where the hydraulic pressure supplied to the secondary pulley is supplied also to the primary pulley. In the (A) state, gear ratio GR of the continuously variable transmission can be controlled to be optimized. In the (B) state, the hydraulic pressure supplied to the secondary pulley is supplied also to the primary pulley. Accordingly, in the case where the hydraulic pressure supplied to the primary pulley is decreased due to some irregular conditions in the (A) state, the hydraulic pressure supplied to the primary pulley can be kept by switching the control valve from the (A) state to the (B) state.

Furthermore, in the (A) state, the hydraulic pressure obtained by decreasing the line pressure is supplied to the clutch or the brake. In the (B) state, the hydraulic pressure controlled by the SLT linear solenoid valve is supplied to the clutch or the brake. Consequently, when the clutch or the brake is engaged, the hydraulic pressure controlled by the SLT linear solenoid valve is supplied to the clutch or the brake, which allows the clutch or the brake to be engaged such that the impact at the time of engagement is reduced. When the clutch or the brake is engaged, the hydraulic pressure supplied to the primary pulley is maintained by an orifice. Therefore, unnecessary upshift or downshift of the continuously variable transmission can be prevented. After the clutch or the brake is engaged, the hydraulic pressure obtained by decreasing the line pressure is supplied to the clutch or the brake, which allows the clutch or the brake to be held in the engaged state such that the power output from the engine is transmitted to wheels.

Accordingly, the fail-safe function for the hydraulic pressure supplied to the primary pulley can be implemented by using the control valve for switching the hydraulic pressure supplied to the clutch or the brake. Therefore, the fail-safe function can be achieved without the need to provide a dedicated valve having only the fail-safe function. Consequently, the fail-safe function can be implemented while preventing an increase in the number of components.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A hydraulic pressure supply unit of a continuously variable transmission that includes a primary pulley and a secondary pulley each holding a transmission member transmitting power, and a friction engagement element to which a hydraulic pressure is supplied for engagement to transmit, to a wheel, power output from a driving source, and changes a gear ratio in accordance with the hydraulic pressure supplied to said primary pulley, said hydraulic pressure supply unit comprising:

a first oil passage to which a hydraulic pressure obtained by decreasing a line pressure is supplied;

a second oil passage to which a hydraulic pressure controlled by a first solenoid valve is supplied;

a third oil passage to which a hydraulic pressure controlled by a second solenoid valve is supplied;

a fourth oil passage for supplying a hydraulic pressure to said secondary pulley;

a fifth oil passage for supplying a hydraulic pressure to said friction engagement element;

a sixth oil passage for supplying a hydraulic pressure to said primary pulley; and a switching valve for switching between a first state where said fifth oil passage is in communication with said first oil passage and interrupted from said second oil passage, and said sixth oil passage is in communication with said third oil passage and interrupted from said fourth oil passage, and a second state where said fifth oil passage is in communication with said second oil passage and interrupted from said first oil passage, and said sixth oil passage is in communication with said fourth oil passage and interrupted from said third oil passage, said fourth oil passage having an orifice.

2. The hydraulic pressure supply unit of a continuously variable transmission according to claim 1, further comprising a switching mechanism for switching said switching valve from said first state to said second state in a case where said friction engagement element is changed from a disengaged state to an engaged state and in a case where said continuously variable transmission downshifts in a state where said continuously variable transmission is controlled such that said continuously variable transmission is prevented from downshifting.

3. The hydraulic pressure supply unit of a continuously variable transmission according to claim 2, wherein, in the case where said continuously variable transmission downshifts in the state where said continuously variable transmission is controlled such that said continuously variable transmission is prevented from downshifting, said first solenoid valve is controlled such that said friction engagement element can be held in the engaged state by the hydraulic pressure controlled by said first solenoid valve when said switching valve is switched to said second state.

* * * * *